Oct. 24, 1950     J. L. HONEYCUTT, SR     2,527,131
ANTIBACKLASH BRAKE FOR FISHING REELS
Filed April 15, 1949
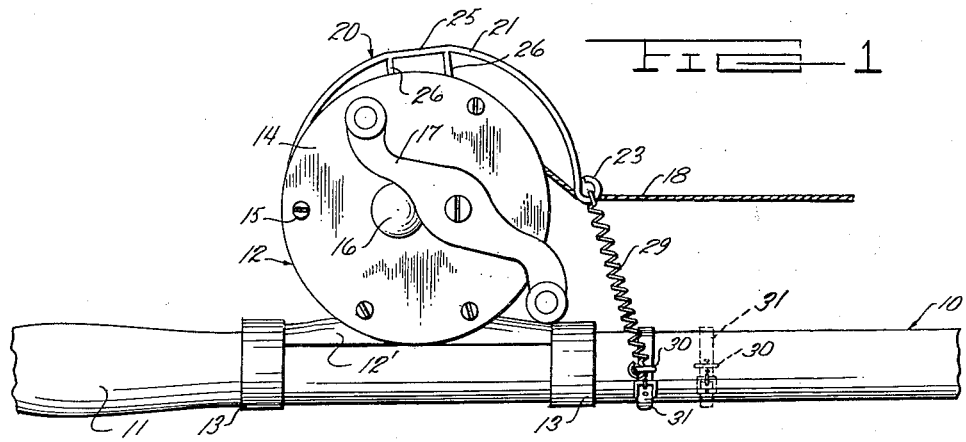
FIG-1
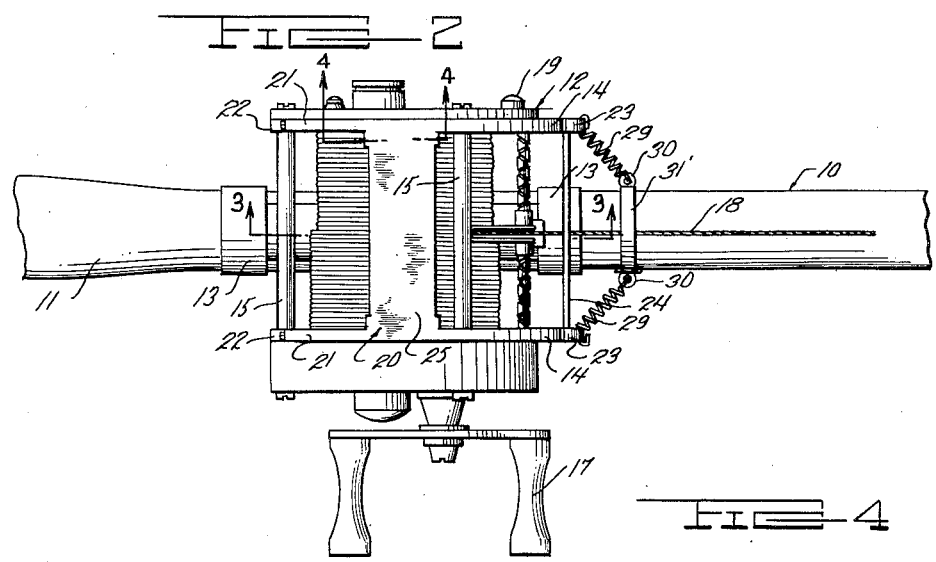
FIG-2
FIG-4
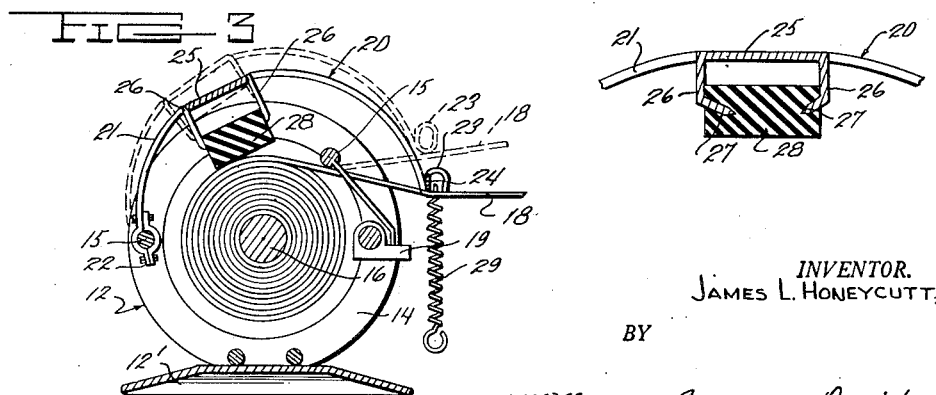
FIG-3
INVENTOR.
JAMES L. HONEYCUTT, SR
BY
McMorrow, Berman & Davidson
ATTORNEYS

UNITED STATES PATENT OFFICE 2,527,131

ANTIBACKLASH BRAKE FOR FISHING REELS

James Ludie Honeycutt, Sr., Harrisonburg, La.

Application April 15, 1949, Serial No. 87,718

5 Claims. (Cl. 242—84.5)

As is well known, when a fishing line is cast, if the running of the fishing reel is not stopped as soon as the plug or bait hits the water, the resultant slacking of the line will cause backlash or overrunning of the line by the reel, whereby to snarl the line. Obviously, if a fish takes the bait or lure at this time, the angler will be unable either to slack the line or reel in the fish by reason of the tangling of the line caused by the backlash. Thus, in all likelihood, a fish will break the line and escape with the lure.

With the foregoing in view, it is an object of my invention to provide an improved anti-backlash brake for a fishing reel which will automatically stop the running of the reel as soon as the line is slackened.

A further object is to provide a device such as that last described which is readily applicable to standard reels without modification thereof, and without the exercise of special skill or the use of special tools.

A further object is to provide an improved anti-backlash brake of the class described which is relatively simple in construction, and strong and sturdy in use, whereby the same may be readily manufactured and sold at low cost so as to be available to virtually every angler.

Other objects and advantages reside in the particular structure of the invention, combination and arrangement of the several parts thereof, and will be readily apparent to those skilled in the art upon reference to the attached drawing in connection with the following specification, wherein the invention is shown, described and claimed.

In the drawing:

Figure 1 is an elevational view of the device according to the invention, showing the same applied to a fishing reel and a fishing pole;

Figure 2 is a plan view thereof;

Figure 3 is a longitudinal vertical sectional view taken substantially on the plane of the line 3—3 of Figure 2;

Figure 4 is a fragmentary longitudinal vertical sectional view on a larger scale and taken substantially on the plane of the line 4—4 of Figure 2.

Referring specifically to the drawing, wherein like reference characters have been used throughout the several views to designate like parts, 10 indicates generally any suitable fishing pole having a hand grip 11 and having mounted thereon any suitable fishing reel 12 by means of the usual brackets 12' and rings 13. The reel 12 comprises the usual spool 16 having the usual end flanges 14 connected together by the usual detachable peripheral series of frame rods 15. The spool 16 is adapted to be rotated by any suitable crank handle 17 geared thereto by any suitable gearing, not shown. A body of fishing line 18 is coiled on the spool 16 in the usual manner. Moreover, in the embodiment illustrated, the spool 16 is provided with a traversing line guide 19 for spreading the line 18 evenly over the spool 16 as the same is reeled in or unreeled therefrom. As so far described, the structure is conventional and forms no part of my invention.

The brake according to the invention comprises a shoe mount, generally indicated at 20 and comprising a pair of laterally-spaced arcuate arms 21. The arms 21 have rear ends pivotally mounted on a rearwardly-disposed frame rod 15 by any suitable bearings 22 so as to pivotally mount the brake shoe mount 20 on the reel in forwardly-extending, overlying and substantially concentric relation to the spool 16. The forward ends of the arms 21 are likewise looped to provide eyes 23 and are integrally connected together in laterally-spaced relation just inwardly of the flanges 14 by a line-riding cross-piece 23. The arms 21 are likewise connected together by an integral cross-arm 25 disposed intermediate the front and rear ends of the arms. The cross-bar 25 comprises a thumb piece for manually applying the brake, if desired. The under side of the cross-arm or bar 25 has formed integrally therewith a pair of depending lugs 26, the free ends of which are directed toward each other at an angle and are embedded in a brake shoe 28 of any suitable braking material. The brake shoe 28 is radially inwardly directed relative to the shoe mount 20 and is normally biased into braking engagement or into a braking position relative to the body of line 18 on the spool 16. Likewise, the cross-piece 24 is normally biased into a line-snubbing position illustrated in full lines in Figures 1 and 3. Such biasing is accomplished by any suitable spring means. In the embodiment illustrated, a pair of coil springs 29 are detachably secured to the eyes 23 on the forward ends of the arms 21. The opposite ends of the springs 21 are adjustably anchored in any suitable manner, as by the eyes 30 formed on opposite sides of a strap 31 or a ring 31', Figures 1 and 2, on the fishing pole 10. A strap 31 is preferred to a ring, as a strap can be secured at various points along pole 10 so as to vary the tension of springs 29. This permits pressure of the brake shoe 28 to be increased or decreased in accordance with the weight of the lure used. The springs 29 are relatively weak, whereby when the line 18 is taut, as in casting or when a fish is pulling on the line, the tension of the line elevates the cross-piece 24 and the brake shoe 28 to the broken line position, Figure 3, and out of the braking and line-snubbing positions aforesaid. Thus, the line is free to run unhampered off of the reel 16. However, as soon as the line slackens, the springs 29 return the parts to the full line positions where the line is braked and snubbed.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a fishing reel of the type wherein a spool of fishing line has end flanges connected by a peripheral series of frame rods, an anti-backlash brake, said brake comprising an arcuate shoe mount having front and rear ends, means pivotally connecting said shoe mount to a rearwardly-disposed frame rod with said shoe mount extending forwardly over said reel substantially concentrically thereof, a radially-inwardly-extending brake shoe fixed to said mount intermediate said front and rear ends, said front end of said mount being a line-riding cross-piece spanning said spool between said flanges thereof, spring means operatively associated with said front end of said mount, said spring means biasing said mount downwardly to dispose said brake shoe and cross-piece respectively in braking and line-snubbing positions, and said cross-piece and brake shoe being elevated by a taut fishing line out of said braking and snubbing positions.

2. In a fishing reel of the type wherein a spool of fishing line has end flanges connected by a peripheral series of frame rods, an anti-backlash brake, said brake comprising an arcuate shoe mount having front and rear ends, means pivotally connecting said shoe mount to a rearwardly-disposed frame rod with said shoe mount extending forwardly over said reel substantially concentrically thereof, a radially-inwardly-extending brake shoe fixed to said mount intermediate said front and rear ends, said front end of said mount being a line-riding cross-piece spanning said spool between said flanges thereof, spring means operatively associated with said front end of said mount, said spring means biasing said mount downwardly to dispose said brake shoe and cross-piece respectively in braking and line-snubbing positions, said cross-piece and brake shoe being elevated by a taut fishing line out of said braking and snubbing positions, and said shoe mount having an upwardly-directed thumb piece for manually maintaining said shoe in said braking position.

3. In a fishing reel of the type wherein a spool of fishing line has end flanges connected by a peripheral series of frame rods, an anti-backlash brake, said brake comprising an arcuate shoe mount having front and rear ends, means pivotally connecting said shoe mount to a rearwardly-disposed frame rod with said shoe mount extending forwardly over said reel substantially concentrically thereof, a radially-inwardly-extending brake shoe fixed to said mount intermediate said front and rear ends, said front end of said mount being a line-riding cross-piece spanning said spool between said flanges thereof, a ring seatable on the fishing pole forwardly of the reel, a pair of coil springs connecting opposite sides of said ring to corresponding ends of said cross-piece, said springs biasing said mount downwardly to dispose said brake shoe and cross-piece respectively in braking and line-snubbing positions, and said cross-piece and brake shoe being elevated by a taut fishing line out of said braking and snubbing positions.

4. In a fishing reel of the type wherein a spool of fishing line has end flanges connected by a peripheral series of frame rods, an anti-backlash brake, said brake comprising an arcuate shoe mount having front and rear ends, means pivotally connecting said shoe mount to a rearwardly-disposed frame rod with said shoe mount extending forwardly over said reel substantially concentrically thereof, a radially-inwardly-extending brake shoe fixed to said mount intermediate said front and rear ends, said front end of said mount being a line-riding cross-piece spanning said spool between said flanges thereof, a strap detachably secured to the fishing pole in selected spaced positions forwardly of said reel, a pair of coil springs connecting opposite sides of said strap to corresponding ends of said cross-piece, said springs biasing said mount downwardly to dispose said brake shoe and cross-piece respectively in braking and line-snubbing positions, and said cross-piece and brake shoe being elevated by a taut fishing line out of said braking and snubbing positions.

5. In a fishing reel of the type wherein a spool of fishing line has end flanges connected by a peripheral series of frame rods, an anti-backlash brake, said brake comprising an arcuate shoe mount having front and rear ends, means pivotally connecting said shoe mount to a rearwardly-disposed frame rod with said shoe mount extending forwardly over said reel substantially concentrically thereof, a radially-inwardly-extending brake shoe fixed to said mount intermediate said front and rear ends, said front end of said mount being a line-riding cross-piece spanning said spool between said flanges thereof, a pair of laterally-spaced coil springs secured to opposite ends of said cross-piece, anchor means anchoring said springs to the fishing pole so as to load said brake shoe and cross-piece into braking and line-snubbing positions, means for adjusting said anchors on the pole so as to vary the tension of said springs, and said cross-piece and brake shoe being elevated by a taut fishing line out of said braking and snubbing positions.

JAMES LUDIE HONEYCUTT, Sr.

No references cited.